United States Patent
O'Connor et al.

(10) Patent No.: US 7,938,251 B2
(45) Date of Patent: May 10, 2011

(54) CHIP STACKER HAVING OUTER SUPPORT FOR TRUSS AND METHOD FOR TURNING TRUSS WITH THE SUPPORT

(75) Inventors: Bernard O'Connor, Beaconsfield (CA); Bruce Kirkpatrick, Dollard des Ormeaux (CA); Janne Lahteenmaki, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 121 days.

(21) Appl. No.: 12/194,067

(22) Filed: Aug. 19, 2008

(65) Prior Publication Data
US 2010/0089723 A1    Apr. 15, 2010

Related U.S. Application Data

(60) Provisional application No. 60/971,619, filed on Sep. 12, 2007.

(51) Int. Cl.
*B65G 65/02* (2006.01)
(52) U.S. Cl. ........................................ 198/508; 414/133
(58) Field of Classification Search ................. 198/508, 198/861.6; 414/133, 564, 744.2; 241/34, 241/186.35, 101.71
See application file for complete search history.

(56) References Cited

U.S. PATENT DOCUMENTS

| | | | | |
|---|---|---|---|---|
| 1,464,747 | A | * | 8/1923 | Case ............................ 414/133 |
| 3,049,244 | A | * | 8/1962 | Hansen ......................... 198/508 |
| 4,363,396 | A | * | 12/1982 | Wolf et al. .................... 198/508 |
| 4,629,060 | A | | 12/1986 | Schlegel et al. |
| 4,776,449 | A | * | 10/1988 | Hoffmann et al. ............ 198/508 |
| 4,998,855 | A | | 3/1991 | Tschernatsch |
| 5,972,696 | A | | 10/1999 | Lipsey |
| 6,508,615 | B2 | | 1/2003 | Taylor |
| 6,676,357 | B2 | * | 1/2004 | Stafford et al. ............... 198/508 |
| 7,000,757 | B1 | | 2/2006 | Schlegel et al. |
| 7,226,011 | B2 | | 6/2007 | Schlegel et al. |
| 2006/0285943 | A1 | * | 12/2006 | Jonkka ......................... 414/133 |

FOREIGN PATENT DOCUMENTS

| | | |
|---|---|---|
| EP | 0 090 981 | 10/1983 |
| FR | 694 555 | 12/1930 |
| FR | 2 257 516 | 8/1975 |
| GB | 2 001 594 | 2/1979 |
| JP | 55-101533 | * 8/1980 |

OTHER PUBLICATIONS

European Search Report for EP Application No. 08 01 5927 completed Oct. 31, 2008.
Andritz "Stack Reclaimer", May 3, 2007.
Andritz "Stacker and Reclaimer", May 12, 2000.
Andritz "Log Handling Cranes", pre-2007.
Andritz "Log Handling Crane", pre-2007.

(Continued)

*Primary Examiner* — James R Bidwell
(74) *Attorney, Agent, or Firm* — Nixon & Vanderhye P.C.

(57) ABSTRACT

A material stacking device including: an elevated truss supported at opposite ends by first and second pillars, the first pillar includes a pivot allowing the truss to pivot about the location of the first pillar and the second pillar moving in an arc as the truss turns about the first pillar, and a material conveyor extending at least part way along the truss and discharging material to be deposited to an upper section of a material pile below the truss.

17 Claims, 2 Drawing Sheets

OTHER PUBLICATIONS

Andritz "Screw Reclaimer", May 12, 2000.
Andritz, "Stacker", Aug. 12, 1999.
FMW "Stacker Reclaimer", prior to 2007.
P&H "Press Release", (Jun. 13, 2006).
"Log Handling Crane", pre-2007.
"PSI Log Crane", pre-2007.

* cited by examiner

CHIP STACKER HAVING OUTER SUPPORT FOR TRUSS AND METHOD FOR TURNING TRUSS WITH THE SUPPORT

RELATED APPLICATION

This application claims the benefit of U.S. Provisional Patent Application Ser. No. 60/971,619 filed Sep. 12, 2007, the entirety of which is incorporated by reference.

BACKGROUND OF THE INVENTION

The invention relates to a wood chip or other material stacker used to form large piles of wood chips and other particulate or granular material. The invention particularly relates to supports for trusses in chip stacking devices.

Wood process plants, e.g., mills, convert logs into wood chips. The wood chips are stored in large piles. From these piles the wood chips are transported to, for example, a digester or refiner that converts the chips to pulp. The storage of wood chips in a pile is generally referred to as stacking the chips.

Conventional chip stacking devices (stackers) deliver the wood chips or other material to the piles and form the piles. Chip stackers typically are large structures, e.g., one-hundred (100) feet high, e.g., thirty three meters, and well over a hundred feet in length. Chips are delivered to an upper truss of the stacker. A conveyor in the truss transports the chips to the end of the truss where the chips are discharged and fall to the stack. The truss is a cantilever beam and extends from a support pillar high over the chip pile. The truss may pivot around the pillar to form a circular or arched shaped chip pile.

The cantilevered truss of a conventional chip stacking device is under tremendous stress due to force moments at the junctions of the truss and pillar and at the base of the pillar. These forces limit the length of the truss and thereby limit the size of the chip pile that can be formed by the chip stacking device. There is a long felt need for a chip stacker capable of forming larger chip piles than can be accommodated by cantilevered truss chip stackers.

SUMMARY OF THE INVENTION

A material stacking device has been developed including an elevated truss supported at opposite ends by first and second pillars, the first pillar includes a pivot allowing the truss to pivot about the first pillar and the second pillar moves in an arc as the truss pivots about the first pillar; a material conveyor extending at least part way along the truss and depositing material to a shuttle mounted on the truss, the shuttle moves back and forth along a center portion of the truss and deposits material to an upper section of a material pile below the truss.

The material may be wood chips, but may also be coal, bark from wood and other large particulate bulk material needing to be stored in a pile. The material stacking device may operate in conjunction with a material reclaim system, e.g., an under-pile reclaim system, that removes material from the pile.

The first pillar may be a center pillar that is itself either stationary or rotates with the truss. A motor may turn the truss about the center pillar or turn both the pillar and truss. The turning movement of the truss/pillar may be incremental, such as a few degrees of rotation for each incremental turn. A material supply conveyor transports material to an inlet end of the truss above the first pillar. The conveyor on the truss continually supplies the shuttle with material as the shuttle moves back and forth along the truss. The shuttle may be mounted to an underside rail(s) of the truss and powered by a motor attached to the shuttle or truss.

The second pillar may be mounted on a moving truck that travels in an arc or circle. The truck may be wheeled and mounted on rails or a flat track. The rails or track may be on a retaining wall that confines the outer edge of the material pile. The truck may be driven by electrical motors and controlled to move the second pillar in coordination with the incremental turning of the truss.

A material stacking device has been developed comprising: an elevated truss supported at opposite ends by first and second pillars, the first pillar includes a pivot allowing the truss to pivot about the location of the first pillar and the second pillar moving in an arc as the truss turns about the first pillar, and a material conveyor extending at least part way along the truss and discharging material to be deposited to an upper section of a material pile below the truss.

A material stacking device has been developed comprising: an elevated truss supported at opposite ends by first and second pillars, the first pillar includes a pivot allowing the truss to pivot about the location of the first pillar and the second pillar moving in an arc as the truss turns about the first pillar; a truck supporting a lower portion of the second pillar, wherein the truck moves in the arc, and a material conveyor extending at least part way along the truss and discharging material to be deposited to an upper section of a material pile below the truss.

A method has been developed for depositing material in a pile comprising: supporting a first end of a truss by a first pillar and supporting a second end of the truss by a second pillar; conveying the material by a supply conveyor to a first pillar of a material depositing truss structure and discharging the material from the supply conveyor to a truss conveyor; conveying the material by the truss conveyor along a truss above the pile and to a discharge of the truss conveyor; depositing the material discharged by the truss conveyor to an upper surface of the pile; pivoting the truss with the first pillar forming a pivot for the first end of the truss and moving the second end of the truss and the second pillar in a arc corresponding to the pivoting of the truss, and after pivoting the truss, further depositing the material discharged by the truss conveyor.

DETAILED DESCRIPTION OF THE INVENTION

Figure 1:
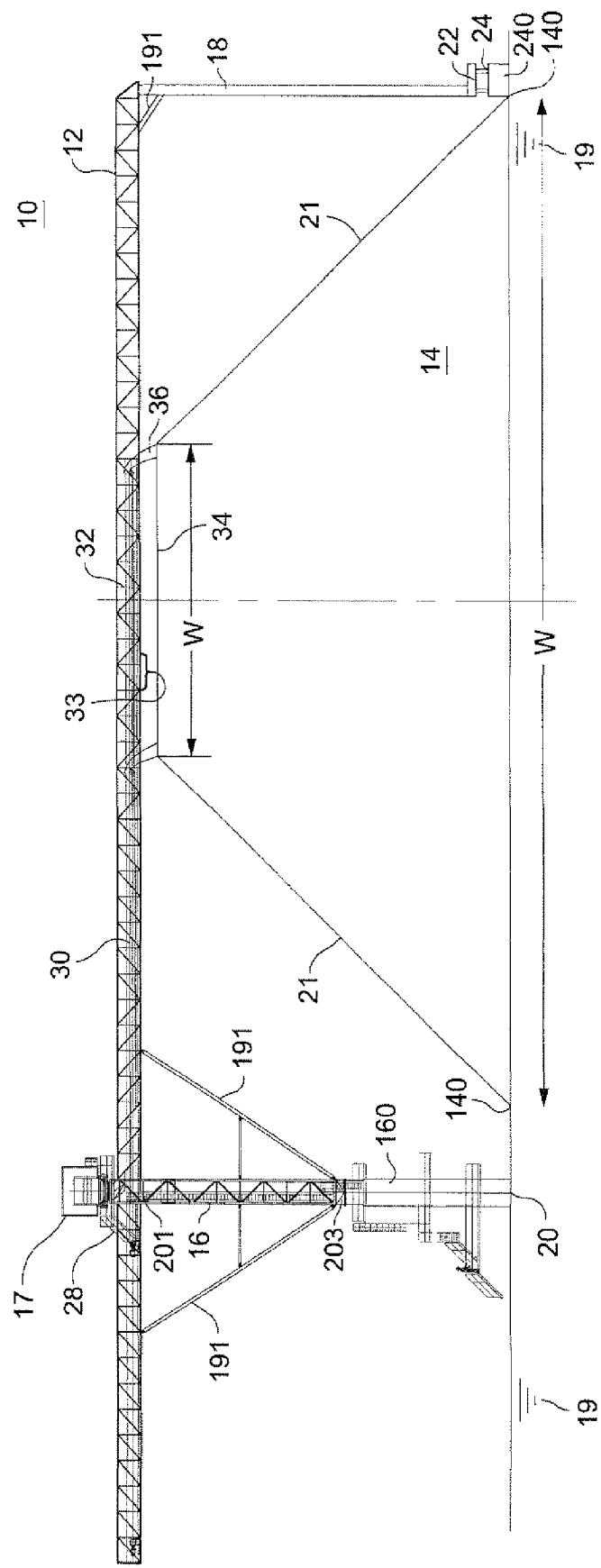
FIG. 1 is a side view of a chip stacker having support pillars at opposite ends of an upper truss.
Figure 2:
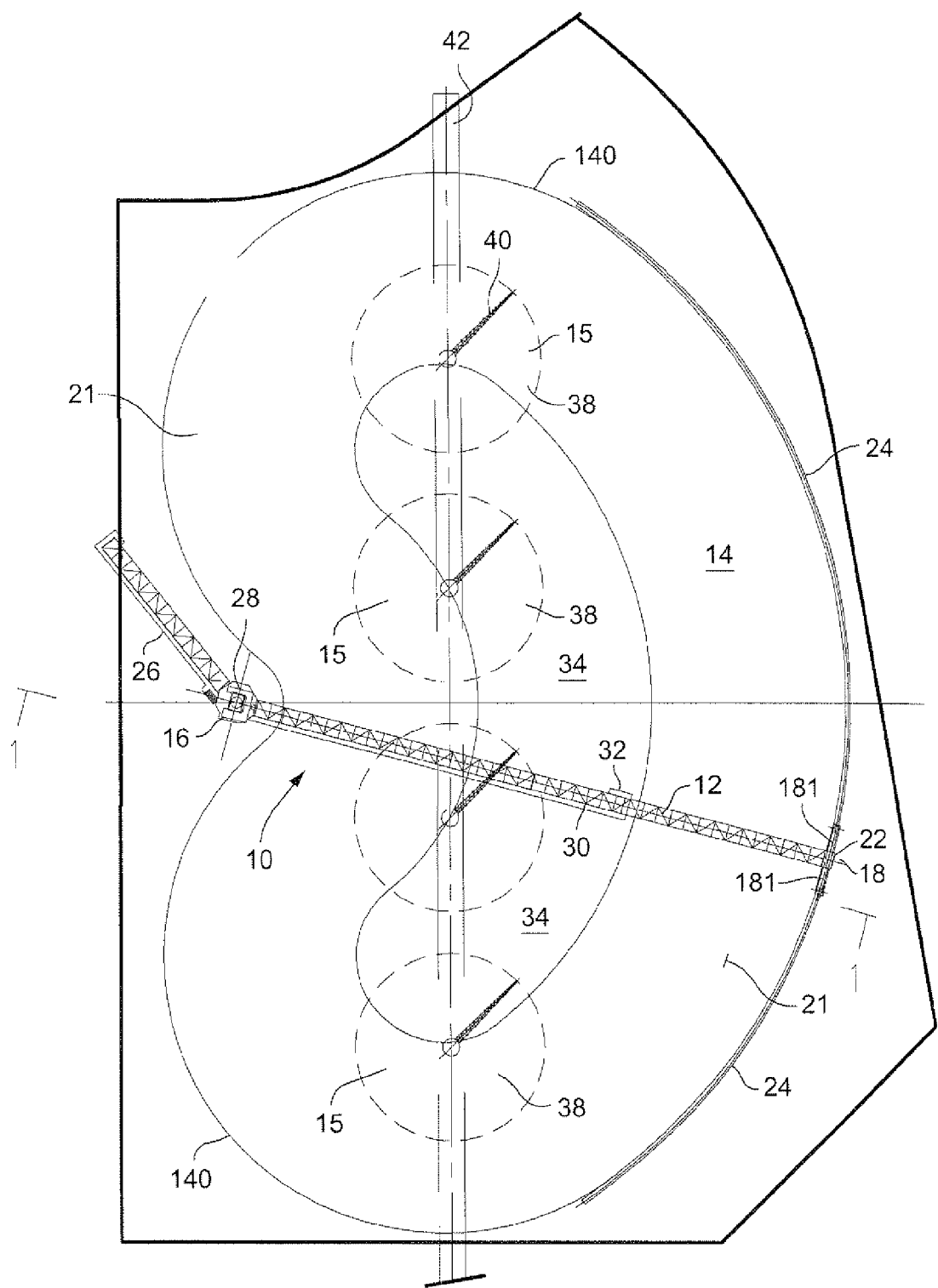
FIG. 2 is a top view of the chip stacker, underlying chip pile and an under-pile chip reclaim system. A section line 1-1 in FIG. 2 indicates the angle of the view shown in FIG. 1.

FIG. 1 is a side view of a chip stacker 10 having an upper horizontal truss 12 extending over a chip pile 14. FIG. 2 is a top down view of the chip stacker, chip pile and under-pile chip reclaim system 15.

The truss 12 is supported by a center pillar 16 and an outer pillar 18. The pillars 12, 18 are at opposite ends of the truss 12. The center pillar 16 is a pivot for the truss. The truss moves in an arc around the center pillar. The arc may be a complete circle or an arc that forms a segment of the circle. The outer pillar 18 moves in an arc with the truss, as the truss pivots about the center pillar.

The truss 12 may be a lattice structure, such as a lattice girder, or other reduced weight, high strength support structure. Similarly, the pillars 16, 18 may be formed of a lattice structure or a reduced weight, high strength support structure. The center pillar may also be entirely or partially a concrete column 160. The center pillar 16 may include a stairway and an upper operator control platform 17. The bottom of the pillars are supported at the ground 19 by a rotating support mechanism 20 at a pivot point. An electrical motor and gear 203 may turn the pillar and truss. Alternatively, the center pillar may be stationary have an upper pivot mechanism 201, e.g., an rotating mount having an annular pivot and a powered drive gear, for the truss at an upper end of the pillar.

The outer pillar 18 is supported by a truck 22 that moves along a circular or arc track 24 on the ground or on a raised track 24, e.g., a retaining wall 240 about six inches to four feet in height. The retaining wall may define the outer edge 140 of the chip pile 14. Alternatively the retaining wall can be high, e.g., above five feet and higher than 20 to 40 feet. The upper ledge of the retaining wall provides the track 24 for the truck of the outer pillar. As a further alternative, the retaining wall 240 may extend up to or near the level of truss 12 and a truck rides on the wall and supports the far end of the truss (without any need for a support pillar). Further, the retaining wall can have openings, such as passageways and can be formed of concrete of steel structure depending on case. The truck 22 is wheeled, such as with metal wheels on rails or rubber wheels on a flat path, and is driven, such as with electrical motors.

By way of example, the truss 12 and pillars 16, 18 may extend 100 feet or more above the ground 19. The truss may extend horizontally well over 100 feet, such as over 300 feet. The chip pile 14 at its bottom (at the ground) has a width that spans substantially the entire length of the truss, e.g., from the outer pillar to within about 25 feet of the center pillar. By way of example, the chip pile may be 8,850,000 cubic feet (250,604 m³).

The chip pile 14 is formed by chips being discharged from the truss to the top area 34 of the chip pile. The sloped sides 21 of the chip pile are formed naturally as the pile of chip increases due to the discharge of chips onto the top of the pile. The length and height of the truss and the width (w) of the top of the chip pile may be selected such that the wood chip pile has a width (W), e.g., 290 feet, at its bottom that extends substantially the entire length of the truss, e.g., at least 80% and preferably more than 90% of the length. The height (H) of the chip pile is near the truss, e.g., within 80% and preferably more than 90% of the height of the truss.

The pillars 16, 18 may extend generally vertically from the ground to the horizontal truss. Diagonal support braces 191 may or may not extend between the upper sections of the pillars and the truss. Preferably, these support braces 191 do not extend to the sides of the chip pile. Further the support braces 191 may be configured as a pylon structure that may or may not have a counterweight to support the truss and the joint between the truss and pillars. The center pillar 16 may be a vertical column that rotates about a support pivot on the ground 19 or a mid-height motorized turning mechanism 203. Alternatively, the center pillar may be stationary and support an upper pivot point 201 about which the truss turns. The outer pillar 18 may also be a vertical column or may be an A-frame, tripod or other generally vertical support structure.

The legs 181 of the outer pillar, e.g., two legs for an A-frame and three legs for a tripod, may be supported by the truck(s) 22. Further, the truck may be a single wheeled vehicle supporting all legs of the outer pillar or a separate truck from each leg 181 of the pillar 18.

Chips are supplied to the center pillar 16 by a supply conveyor 26 that delivers chips to an upper inlet on the truss of the stacker. Chips are transported along the truss 12 of the stacker by a first conveyor 30 that may extend to the far edge to the top 34 of the chip pile 14. From the first conveyor 30, chips are discharged to a shuttle 32 supported by the truss and that moves back and forth along the truss. The shuttle 32 is a second conveyor that takes chips from the first conveyor and distributes chips over the top of the chip pile 34. The top 34 of the pile may be, for example, 90 feet wide (30 meters) where the height of the pile is nearly 100 feet (33 meters) and have a width of nearly 300 feet (100 meters) at the base of the chip pile.

In operation, chips flow from the shuttle to the top 34 of the chip. As the top of the chip pile below the shuttle rises above a predetermined level, e.g., within ten (10) feet (3.3 meters), of the elevation of the shuttle, a chip pile elevation sensor 36, e.g., a rod extending vertically down from the truss, detects when the elevation of the chip pile rises above the predetermined elevation. The shuttle 32 may include a chute 33 extending downward from the shuttle to the top of the chip pile. Chips flow from the shuttle, through the chute and to the pile. The chute directs chips directly to the top of the chip pile and minimizes chips being blown away from the pile as the chips fall from the shuttle to the pile. The chute may be a bolt-on, fixed length chute that can be adjusted in length depending on seasonal changes in the desired pile height. Alternatively, the chute 33 may telescope to extend downward to the top of the chip pile. The telescoping chute 33 is retracted upward as the height of the chip pile increases.

Once the chip pile 14 rises above the predetermined elevation, the shuttle 32 is moved incrementally along the truss 12 such as by 4 to 10 feet and delivers chips to another location on the top of the chip pile. The sequence of delivering chips on the top of the pile until the chip pile 14 below the shuttle 32 rises above a predetermined level and incrementing the shuttle continues until the shuttle traverses the width (w) of the top of the chip pile. After traversing the width of the top of the chip pile, the truss is pivoted by a few degrees, e.g., 2 to 10 feet, by driving the truck 22 along the track 24 to advance the outer pillar and turn the truss. The truck may be moved a predetermined incremental distance to turn the truss and move the shuttle to above another region of the chip stack.

The incremental turning of the truss may be assisted by a turning motor and gear arrangement 203 at the pivot point for the truss and, optionally, all or a portion of the center pillar. The turning motor and gear arrangement may turn the truss in coordination with the truck that advances the outer pillar in an arc. After the truss has been incrementally turned, the shuttle 32 resumes its traversal of the width of the top of the chip pile. Distribution of chips from the shuttle may be continuous during the movement of the shuttle and the truss.

Alternatively, the chip pile 14 may be formed by slewing the truss 12 back and forth, e.g., shifted back or forth or rotating the truss in a circle, while the shuttle 32 is at a constant position on the truss. The chip pile forms in an arc or circle. The stacker sequence may begin with the shuttle discharging chips either at a radially inward section of the truss or extended out towards the outer end of the truss and outer periphery of the chip pile, e.g., adjacent the retaining wall. After the truss has completed a slew direction, e.g. a sweep of the arc in one direction or a complete circle, the shuttle is incrementally moved along the truss, and the truss is again slewed such as in a reverse arc direction or in another circle. Chips are deposited on the chip pile along the inner or outer curved edge of the top of the chip pile. The chip pile 14 grows in a radial direction (radially inward or outward) due to the slewing movement of the truss. As the stacker slews back and forth, the chip pile the forms an ring or an arc having a gradually radially outer or inner sidewall 21. Each slew movement would traverse the entire arc of the pile until the pile has built advancing up the pile to the desired height beneath the truss. Thereafter, the shuttle would move in or out several feet while the stacker continues to slew.

A chip reclaim system 15 may be arranged on the ground and beneath the chip pile 14. The reclaim system may be a series of under-pile circular slewing screw conveyors 40 that move in a circular path 38 to reclaim chips from the stack and direct the chips to an underground tunnel 42 having a conveyor. The screw conveyors 40 withdraw chips from the bottom of the chip stack (pile) and direct the chips to the tunnel. The under-pile conveyor may also be one or more linear screw conveyors extending the width (W) of the chip pile. Examples of under-pile linear screw conveyors include the Kone-Wood™ series of supplied by the Andritz Group of companies of linear screw reclaimers. The shuttle replenishes the chip stack by depositing chips to the top of the stack.

As an alternative to an under-pile chip reclaim system 15, the reclaim system may take chips from a sidewall of the chip stack. For example, a conventional sweeper arm with screw conveyor or chain conveyor may extend widthwise across a bottom edge of the chip pile and direct chips to a center collector at the center pillar. The sweeper arm includes a rake extending up the side of the chip stack and directing chips down towards the sweeper arm. The sweeper arm and rake pivot about the center pillar and turn inwards to the chip stack as chips are removed from a rear side an arc shaped chip stack. The truss and shuttle follow the sweeper arm and rake pivot to deposit chips on top of the pile, such that chips advance a front edge of an arc shaped chip stack. The truss/shuttle and sweeper arm/rake pivot may each move in a circle continually depositing and reclaiming chips from the chip stack, where the stack is an arc that continually and slowly moves around the circle. Further, mobile loaders may also be used as a reclaim system wherein the mobile loaders moved about the chip pile to recover the chips.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A material stacking device comprising:
   an elevated truss supported at opposite ends by first and second pillars, the first pillar includes a pivot allowing the truss to pivot about the location of the first pillar and the second pillar moving in an arc as the truss turns about the first pillar,
   a truck supporting a lower region of the second pillar, wherein the truck includes a wheel supporting the truck and engaging a support surface, wherein the wheel is mechanically driven by a drive system mounted on the truck or second pillar, and
   a material conveyor extending at least part way along the truss and discharging material to be deposited to an upper section of a material pile below the truss.

2. The material stacking device as in claim 1 further comprising a shuttle mounted on the truss, the shuttle moving back and forth along a center portion of the truss, wherein the shuttle receives the material discharged from the material conveyor and discharges the material to the upper section of the material pile.

3. The material stacking device as in claim 1 wherein material is one of wood chips, coal and wood bark.

4. The material stacking device as in claim 1 further comprising a material reclaim system.

5. The material stacking device as in claim 4 wherein the material reclaim system includes an under-pile reclaim system that removes material from a bottom region of the material pile.

6. The material stacking device as in claim 1 wherein the first pillar rotates with the truss.

7. The material stacking device as in claim 6 further comprising a supply conveyor having a discharge outlet proximate to the first pillar and to an inlet to the material conveyor, wherein the supply conveyor transports the material to the material conveyor.

8. The material stacking device as in claim 1 wherein the wheels of the truck engage rails or a flat track on the support surface.

9. The material stacking device as in claim 8 wherein the rails or track are mounted on a retaining wall and the retaining wall has an upper rim forming the support surface.

10. A material stacking device comprising:
    an elevated truss supported at opposite ends by first and second pillars, the first pillar includes a pivot allowing the truss to pivot about the location of the first pillar and the second pillar moving in an arc as the truss turns about the first pillar;
    a truck supporting a lower portion of the second pillar, wherein the truck moves in the arc, wherein the truck is motorized;
    a motor proximate to the first pillar and said motor turns the truss about the first pillar, and
    a material conveyor extending at least part way along the truss and discharging material to be deposited to an upper section of a material pile below the truss.

11. The material stacking device as in claim 10 further comprising a shuttle mounted on the truss, the shuttle moving back and forth along a center portion of the truss, wherein the shuttle receives the material discharged from the material conveyor and discharges the material to the upper section of the material pile.

12. The material stacking device as in claim 10 further comprising an under-pile reclaim system that removes material from a bottom region of the material pile.

13. A method for depositing material in a pile comprising:
    supporting a first end of a truss by a first pillar and supporting a second end of the truss by a second pillar;
    conveying the material by a supply conveyor to a first pillar of a material depositing truss structure and discharging the material from the supply conveyor to a truss conveyor;
    conveying the material by the truss conveyor along a truss above the pile and to a discharge of the truss conveyor;
    depositing the material discharged by the truss conveyor to an upper surface of the pile;
    pivoting the truss with the first pillar forming a pivot for the first end of the truss and moving the second end of the truss and the second pillar in a arc corresponding to the pivoting of the truss, wherein a lower region of the second piller is supported by a motorized truck moving the second pillar and the motorized truck moves the second pillar in the arc, and
    after pivoting the truss, further depositing the material discharged by the truss conveyor.

14. The method in claim 13 further comprising discharging the material from the truss conveyor to a shuttle conveyor coupled to the truss;
   moving the shuttle along the truss, and
   discharging material from the shuttle to the upper section of the pile after moving the shuttle.

15. The method in claim 13 wherein the motorized truck moves along an arc shaped retaining wall.

16. The method in claim 13 further comprising reclaiming the material from the pile using a material reclaim system.

17. The method in claim 13 wherein at least a portion of the first pillar pivots with the truss.

\* \* \* \* \*